United States Patent
Angelbeck, Jr.

[15] 3,667,403
[45] June 6, 1972

[54] PALLET
[72] Inventor: John A. Angelbeck, Jr., Chesterfield, Mo.
[73] Assignee: Pack-Rite Packaging & Crating Co., Inc.
[22] Filed: June 11, 1970
[21] Appl. No.: 45,511

[52] U.S. Cl. .......................................................... 108/58
[51] Int. Cl. ........................................................ B65d 19/18
[58] Field of Search ............................................. 108/51–58

[56] References Cited

UNITED STATES PATENTS

| | | | |
|---|---|---|---|
| 3,307,504 | 3/1967 | Cloyd et al. | 108/58 |
| 3,511,191 | 5/1970 | Berry, Jr. et al. | 108/58 |
| 3,255,720 | 6/1966 | Rasquier | 108/51 |
| 2,602,619 | 7/1952 | McIntyre | 108/57 |
| 3,404,642 | 10/1968 | Belcher et al. | 108/51 |
| 2,568,582 | 9/1951 | Farrar | 108/57 |
| 2,699,912 | 1/1955 | Cushman | 108/58 |
| 3,405,666 | 10/1968 | Miller | 108/58 |
| 3,526,195 | 7/1970 | Maryonovich | 108/53 |
| 3,561,375 | 2/1971 | Hammond | 108/58 |
| 3,511,962 | 5/1970 | Suter | 219/93 |

Primary Examiner—Bobby R. Gay
Assistant Examiner—Glenn O. Finch
Attorney—Robert J. Schaap

[57] ABSTRACT

A pallet used for the storage and transporting of load bearing structures. The pallet is formed by securing two mating unitary plastic members by means of bolts or other fasteners. The two plastic members are formed in a rotational molding operation and each includes a pair of spaced outer skins which are internally connected by a plurality of properly spaced webs for internal strength. The skins also have a plurality of strategically located apertures which extend through each of the skins.

10 Claims, 4 Drawing Figures

PATENTED JUN 6 1972 3,667,403

INVENTOR
JOHN A. ANGELBECK, JR.
BY Robert J. Scharp
ATTORNEY

PALLET

This invention relates in general to certain new and useful improvements in Pallets and, more particularly, to pallets which are formed by securing two mating unitary plastic members by means of bolts or other fasteners and which pallets are used in the storing and transporting of relatively large containers and similar load bearing items.

For many years it has been a widespread practice to use wooden pallets for the storage and transporting of large containers such as barrels, kegs and the like. The use of pallets formed of wood has been extant to a large degree in such industries as the beer industry where considerable movement of the beer kegs is a resultant facet of manufacturing and delivery.

However, there are a number of drawbacks to the use of wooden pallets, particularly in the realm of economics and practicality. From a practical standpoint, wooden pallets are quite difficult to maintain and after a period of time, are rendered ineffective for use when subject to normal abuse in the trade. Furthermore, where the wooden pallets are used in a normally humid atmosphere or in a location where they are subject to contact with liquid substances, the wood can rapidly deteriorate. From an economic standpoint, the wooden pallets have a shorter life than pallets formed of other materials and in addition are more costly in terms of purchase price than pallets formed of non-wooden materials.

Many problems are inherent in the use of wooden pallets in a wide variety of applications. The wooden pallets are constructed by placing the frame members and cover boards in the desired locations and securing the same by means of nails or staples. However, after some use, these metal securement means are ultimately urged out of their point of securement thereby rendering the pallet defective. Vibration, which often results from carrying the pallets on a moving vehicle, causes the nails or other metal fasteners to work out of their fastening positions. Furthermore, the wooden pallets have a substantially greater weight than a plastic pallet constructed of substantially equal size. Consequently, freight costs are higher when wooden pallets are employed over plastic counterpart pallets.

There are other less obvious, but nevertheless, serious disadvantages in the use of wooden pallets. The fibrous nature of wood used in the wooden pallets does not readily lend the pallets to complete sterilization, which may be desirable in many applications. In addition, a plastic pallet can be colored to the customer's specifications by incorporating a dye or other coloring agent into the plastic particles prior to the molding operation. While wooden pallets can be painted, the additional operation raises the total cost of the pallet. Furthermore, after a period of use, the paint will begin to deteriorate or wear off thereby necessitating a repainting of the pallet.

There has been a recent introduction in the marketplace of pallets formed primarily of plastic materials. However, these pallets, like their wooden counterparts also suffer from a number of disadvantages. The plastic pallets by the nature of their employment must include an upper load supporting wall and a bottom wall which is provided with some means for contacting the floor or other supporting structure. These two walls must be supported in some fashion to maintain rigidity, even under loading. The pallets generally include some type of internal rib structure, latice or web structure to maintain the spacing between the two walls and to provide internal strength. The presently available techniques used in the making of the pallets resides in rotational molding or extrusion blow molding. However, molds necessary to produce structures of this type are quite expensive. In many cases, the processes for producing these pallets results in a substantial cost which does not afford any significant economic advantage over wooden pallets.

It is, therefore, the primary object of the present invention to provide a pallet for the storage and transporting of large containers, where the pallet is characterized by a plurality of mating members of unitary plastic construction which are secured together by means of metal fasteners.

It is another object of the present invention to provide a pallet of the type stated which each of the mating members are selectively provided with a plurality of strategically located internal webs to afford sufficient internal strength.

It is a further object of the present invention to provide a pallet of the type stated which is relatively rigid in its construction and which is relatively inexpensive to manufacture.

It is an additional object of the present invention to provide a pallet of the type stated which is capable of effectively competing with conventional wooden pallets.

It is also an object of the present invention to provide a pallet of the type stated which is capable of being used in a wide variety of conditions and which can be used for supporting a wide variety of types and sizes of load bearing items.

With the above and other objects in view, my invention resides in the novel features of form, construction, arrangement and combination of parts presently described and pointed out in the claims.

In the accompanying drawings (1 sheet):

GENERAL DESCRIPTION

Figure 1:
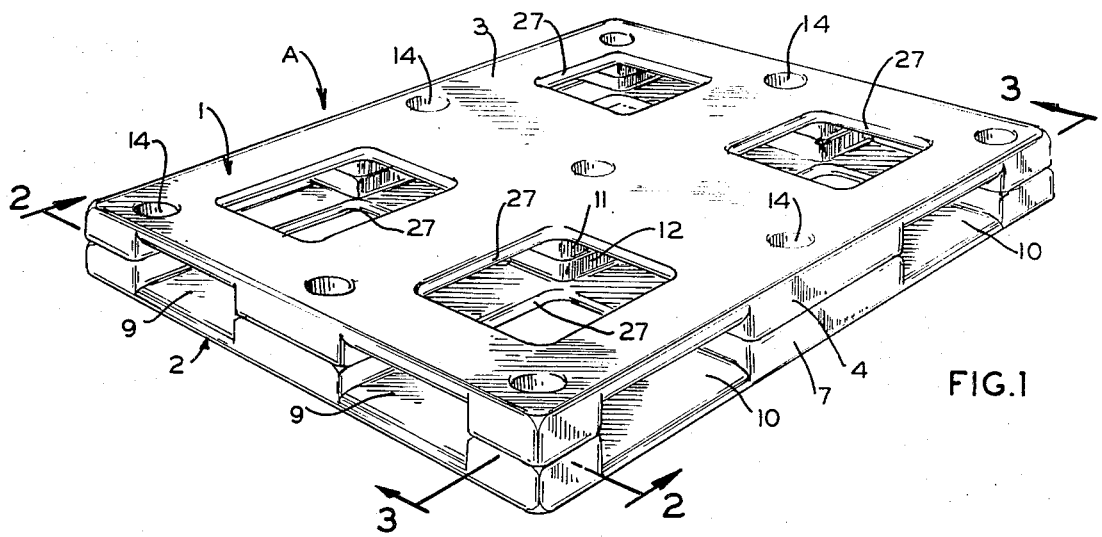
FIG. 1 is a perspective view of a pallet constructed in accordance with and embodying the present invention.

Generally speaking, the present invention relates to a pallet which is constructed from two compatible pallet forming sections and which are formed entirely of a plastic or synthetic resinous material. Each of the two sections are formed in a rotational molding operation and are substantially identical to each other. Furthermore, each of the two pallet forming sections are provided with mating interlocking means so that the two pallet forming sections may be facewise disposed on each other and secured together in a unitary structure by means of bolts or other type of fasteners.

One of the pallet forming sections is formed with a relatively flat top wall which is capable of receiving load bearing structures thereon. Integrally formed with the top wall is a peripheral side wall which integrally merges into a bottom wall, the latter being spaced from the top wall. The peripheral side wall and the bottom wall are formed with longitudinally and laterally extending skid receiving apertures which divide the bottom wall into a series of step-like elements. These step-like elements engage similar step-like elements on the upper wall of the second of the pallet forming sections. The top wall of this first pallet forming section is provided with a plurality of recesses located substantially in the center of each of the steps. The recesses communicate with bolt receiving apertures which extend through the bottom wall. The recesses and apertures are formed by webs which interconnect the top and bottom walls and provide internal strength and rigidity.

The second pallet forming section is substantially identical to the first, as previously stated, and also includes a relatively flat bottom wall which is engagable with the floor or similar supporting structure. This bottom wall is integrally formed with a peripheral side wall which integrally merges into a top wall. The top wall and peripheral side wall of the second pallet forming section are also provided with longitudinally and laterally extending skid receiving apertures which divides the top wall into a series of upwardly presented step-like elements engagable with the step-like elements of the bottom wall of the first described pallet forming section. In like manner, the bottom wall of this second pallet forming section is provided with a plurality of recesses located substantially in the center of each of the steps. The recesses communicate with bolt receiving apertures which extend through the top wall and which are aligned with the bolt receiving apertures in the upper pallet forming section. The recesses and apertures are formed by webs which interconnect the top and bottom walls and also provide for internal strength and rigidity.

Bolts or other similar fasteners extend through the bolt receiving apertures of the two sections to secure the two sections in the form of a unitary structure when the first and second pallet forming sections are facewise disposed upon each other in marginal registration. Outwardly extending bosses are formed on certain of the steps of the upper and lower pallet forming sections and fit into depressions formed in opposed steps on the other of the pallet forming sections. This combination of bosses and depressions provides for proper marginal registration of the two pallet forming sections.

The present invention also provides a modified form of pallet which is comprised of upper and lower pallet forming sections similar to the previously described upper and lower pallet forming sections. However, in the modified form of pallet, the upper pallet forming section has a series of steps on its bottom wall which have planar surfaces located at varying distances from the upper wall of the upper pallet forming section. In like manner, the lower pallet forming section has a series of steps on its top wall which have planar surfaces located at varying distances from the bottom wall of the lower pallet forming section. Several of the steps have extended flanges which engage opposed steps on the opposite pallet forming sections. The sizes and locations of the various steps on the upper and lower pallet forming sections are coordinated so that the two sections can be facewise engagable in marginal registration and secured together by means of metal fasteners.

DETAILED DESCRIPTION

Referring now in more detail and by reference characters to the drawings which illustrate a preferred embodiment of the present invention, A designates a pallet which comprises an upper pallet forming section 1 and a lower pallet forming section 2. Each of the pallet forming sections are facewise disposed upon each other in marginal registration in the manner as illustrated in FIG. 1, and are secured together in such position.

Each of the pallet forming sections 1, 2 are formed of unitary construction from a suitable plastic or synthetic resin material such as high density polyethylene. It has been found in connection with the present invention that rotation molding is one of the most effective molding techniques used in the formation of the pallets, forming sections 1, 2. While high density polyethylene has been found to be one of the most suitable materials used in the formation of these pallet forming sections 1, 2, the invention is by no means limited to this particular material. Other materials which can be used in the formation of the pallets are polyvinyl chloride, polystyrene, polystyrene-butadiene copolymers, a number of other polyvinyl halide polymers and a number of acrylate and methacrylate copolymers, etc.

The resin chosen for use in the manufacture of the pallet forming sections 1, 2, would normally depend upon the particular desired end use of the pallet. Strong consideration is given to the density and melt index of the resin to be selected inasmuch as these parameters will influence properties such as softening temperature, stiffness, environmental stress cracking resistance and impact strength. A higher softening temperature is desirable in applications which may require sterilization of the pallet or high temperature use. A high rigidity factor is desirable where the pallets are constructed with a thin wall for economic reasons or where good dimensional stability is important.

In many cases, it may be desirable to add stabilizers so that the resin used in the formation of the pallet forming sections is properly protected from both thermal and ultraviolet light degradation. These additives are conventionally well known and the particular additive and the amount used will depend on the service and color requirements of the pallet. It may also be desirable to add a pigment or other coloring agent to the plastic pellets used in the formation of the pallet forming sections, in order to render the desired color to the pallet. Again, the coloring agents which would be employed are well known in the plastics industry. Some of the conventional well known coloring agents are isoindolinone, dianisidine, anthrapyrimidine phthalocyanine, carbon black, titanium dioxide, etc.

Figure 2:
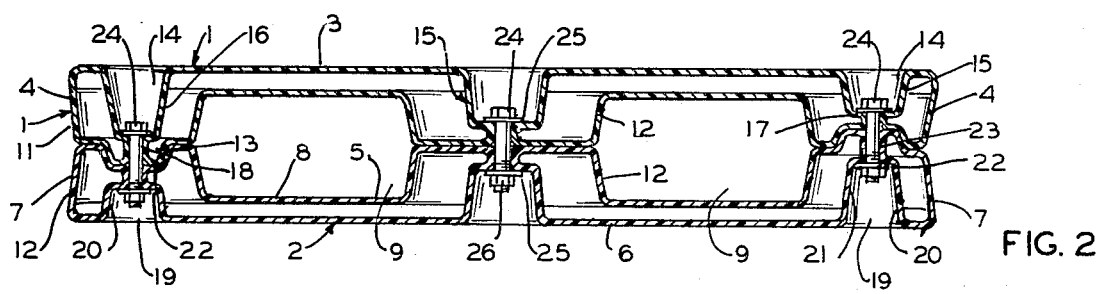
FIG. 2 is a longitudinal sectional view taken along line 2—2 of FIG. 1.
Figure 3:
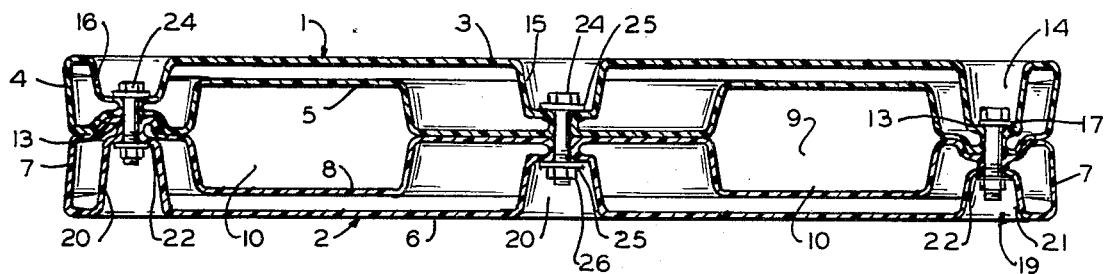
FIG. 3 is a transverse sectional view taken along line 3—3 of FIG. 1.

The upper pallet forming section 1 is formed as an integral unit with a pair of essentially opposed spaced sheets or so-called "skins" in the manner as illustrated in FIGS. 2 and 3. The pallet forming section generally comprises a relatively flat top wall 3 and integrally formed with the top wall 3 is a rectangularly shaped peripheral side wall 4 which extends around the entire periphery of the top wall 1. A bottom wall 5 having an initially flat shape thereto integrally merges into the peripheral side wall 4.

The lower pallet forming section 2 is also formed as an integral unit with a pair of essentially opposed spaced skins, in the manner as illustrated in FIGS. 2 and 3. The lower pallet forming section 2 generally comprises a relatively flat bottom wall 6 and integrally formed with the bottom wall 6 is an upstanding rectangularly shaped peripheral side wall 7 which extends around the entire periphery of the bottom wall 6. A top wall 8 having an initially flat shape thereto and which is a compliment to the shape of the bottom wall 5 integrally merges into the peripheral side wall 7.

The upper and lower pallet forming sections 1, 2 are molded in such manner that the pallet A is provided with a pair of laterally spaced rectangularly shaped elongated skid receiving slots 9 which extend longitudinally through the pallet and open on each transverse end thereof. By reference to FIG. 1, it can be seen that the elongated slots 9 are formed in each of the lateral portions of the peripheral walls 4, 7. The elongated slots 9 are sized to receive the skids or forks of a conventional fork lift vehicle (not shown). The elongated slots 9 open into each of the opposed lateral portions of the peripheral walls 4, 7, with beveled edges in the manner as illustrated in FIG. 1, which aid in the guiding of the skids into the elongated slots 9 and prevent marring of the peripheral walls 4, 7.

The upper and lower pallet forming sections 1, 2 are also molded in such manner that the pallet A is also provided with a pair of longitudinally spaced rectangularly shaped elongated skid receiving slots 10 which extend laterally through the pallet A and open on each of the longitudinally extending portions of the peripheral walls 4, 7. In like manner, the slots 10 are formed with beveled edges to facilitate receiving the skids of a conventional fork lift vehicle. It should also be observed that the slots 10 are located on the same horizontal plane as the elongated slots 9 and communicate internally in the pallet A with the elongated slots 9. In many cases, it is not necessary to provide for the skid receiving slots 9 or the skid receiving slots 10 or either of the slots 9, 10. Accordingly, the inclusion of skid receiving slots in the pallet A is optional.

By reference to FIGS. 2, and 3, it can be observed that the elongated skid receiving slots 9 and 10 in combination divide the bottom wall 5 of the upper pallet forming section 1 into a series of steps 11 and the slots 9, 10 divide the top wall 8 of the lower pallet forming section 2 into a series of steps 12. Each of the steps 11 on the upper pallet forming section 1 have lower planar surfaces which are parallel to the top wall 3 and are equidistantly spaced from the top wall 3. In like manner, the steps 12 of the lower pallet forming section 2 have upper planar surfaces which are parallel to the bottom wall 8 and are equidistantly spaced from the bottom wall 8. Furthermore, the planar surfaces of each of the steps 11, 12, on both the upper and lower pallet forming sections 1, 2 are engagable with each other when the pallet forming sections 1, 2 are facewise disposed on each other in marginal registration.

It can be observed that the elongated slots 9, 10 divide both the bottom wall 5 and the top wall 8 of the pallet forming sections 1, 2, respectively into three longitudinally spaced rows of steps where each row has three steps. Furthermore, each of the steps 11, 12 are rectangular in horizontal cross section and have approximately the same size and shape.

One of the corner steps 11 and the corner step 11 located diagonally thereacross in the upper pallet forming section 1 each have depending bosses 13. The corner steps 12 in the lower pallet forming section 2 located immediately beneath these first two named corner steps have depressions sized to receive the depending bosses 13. The opposite two corner steps 11 in the upper pallet forming section 1 have depressions which are sized to receive upstanding bosses 13 on the opposite two corner steps of the lower pallet forming section 2.

These bosses 13 and the associated depressions provide an interlocking structure enabling the two sections 1, 2 to be located in marginal registration for ultimate securement. Thus, the top wall 8 of the lower pallet forming section 2 and the bottom wall 5 of the upper pallet forming section 1 have step-wise mating surfaces which are engagable with each other when the upper and lower pallet forming sections 1, 2 are facewise disposed on each other in marginal registration.

The upper pallet forming section 1 is provided with a plurality of recesses 14 formed in the top wall 3 and each recess is located approximately over the center of each of the steps 11 formed on the bottom wall 5. Each of the recesses are formed by a webb 15 which includes a somewhat tapered side wall 16 and which integrally merges into a relatively flat lower wall serving as a shoulder 17. A bolt receiving aperture 18 associated with each of the recesses 14 communicates with each of the recesses 14 and opens at its lower end into the bottom wall 5. It can be seen by reference to FIG. 3 that the bolt receiving apertures 18 are diametrally reduced with respect to the size of the recesses 14.

The lower pallet forming section 2 is also provided with a plurality of recesses 19 in the bottom wall 6 and each recess 19 is located approximately over the center of each of the steps 12 formed on the top wall 8. The recesses 19 are also formed by the webs 20 having a tapered side wall 21 and a relatively flat upper wall serving as a shoulder 22. A bolt receiving aperture 23 associated with each of the recesses 19 communicates with each of the recesses 19 and opens at its upper end into the top wall 8. In like manner, the bolt receiving apertures 23 are diametrally reduced with respect to the size of the recesses 19.

By further reference to FIGS. 2 and 3, it can be seen that the bolt receiving apertures 18, 23 have the same diametral size and are aligned with each other when the upper and lower pallet forming sections 1, 2 are facewise disposed in marginal registration. In addition, it can be seen that the bolt receiving apertures 18, 23 extend through the bosses 13 and the associated depressions where they exist on the various steps 11, 12.

It can also be seen that the recesses 14, 19, in each of the pallet forming sections 1, 2 have rounded corners where they are formed in the various components. Furthermore, the various recesses 14, 19 and associated bolt receiving apertures are so located in strategic positions so that the upper and lower walls in each of the pallet forming sections are reinforced by the webs 15, 20. In essence, the various webs 15, 20 extending through the two skins form a type of honeycomb structure providing sufficient internal strength and rigidity. It should also be observed that the two pallet forming sections 1, 2 are substantially mirror images of each other and therefore, the upper pallet forming section 1 is only rotated 180° in a horizontal plane and inverted so that it can be placed in a mating position with the lower pallet forming section 2. Accordingly, each of the pallet forming sections 1, 2 can be formed in the same mold. The top wall 3 of the upper pallet forming section 1 serves as a load bearing surface and the bottom wall 6 of the lower pallet forming section 2 serves as a floor or support engagable member.

The bolt receiving apertures 18, 23 are sized to receive conventional bolts 24 which are fitted with washers 25 and nuts 26. Furthermore, it can be seen that the heads of the bolts 24 are secured against the shoulders 17 and that the washers 25 and nuts 26 bear against the shoulders 22. The recesses 14, 19 are formed with sufficient depth so that the heads of the bolts 24 and the washers 25 and the nuts 26 do not project above the upper and lower planar surfaces of the pallet A.

It should be recognized that while bolts are illustrated and that bolts have been found to be the most successful and effective type of fasteners employed, the present invention is not limited to the bolt and nut type fastener as illustrated. Other types of metal fasteners well known in the fastener industry could be employed as well. For example, heavy rivets, and similar devices could be used in place of the bolt and nut structure.

It should also be observed that the use of two pairs of spaced skins used in the formation of the pallet of the present invention lends significantly to the increased internal strength afforded by the pallet. Moreover, the upper two skins are internally reinforced by a plurality of internally located webs and the lower two skins are internally reinforced by a plurality of internally located webs. Accordingly, while each of the individual sections could not serve as a pallet in and of itself, the two sections when secured together provide a pallet which is capable of supporting considerable loading. The pallets A of the present invention therefore can be used in a stacked structure arrangement to support a number of levels or tiers of loads.

The pallet A is also provided with four rectangularly spaced vertically disposed apertures 27 in the manner as illustrated in FIG. 1. The apertures 27 extend between the top wall 3 and the bottom wall 6 and are located between two rows of steps in the manner as illustrated. The apertures 27 are sized to receive the rollers of a conventional hand lift operated mechanism. Furthermore, the apertures 27 communicate internally within the pallet A with the longitudinally extending skid receiving slots 9 and the laterally extending skid receiving slots 10 at the common intersections thereof. It should be recognized that the apertures 27 are optional in the fabrication of the pallet A and would not necessarily be employed in all cases.

It has been found in connection with the present invention that pallets of two pallet forming sections in the manner as illustrated and described, readily lend themselves to support of considerable weight. By virtue of the four layers or skins connected by web members and secured by metal fasteners, the pallets are able to support the weight of a number of pallets stacked in tiers. In addition, the pallets of the present invention can be manufactured at a relatively low unit cost inasmuch as the same mold can be used in the fabrication of both of the pallet forming sections.

Figure 4:
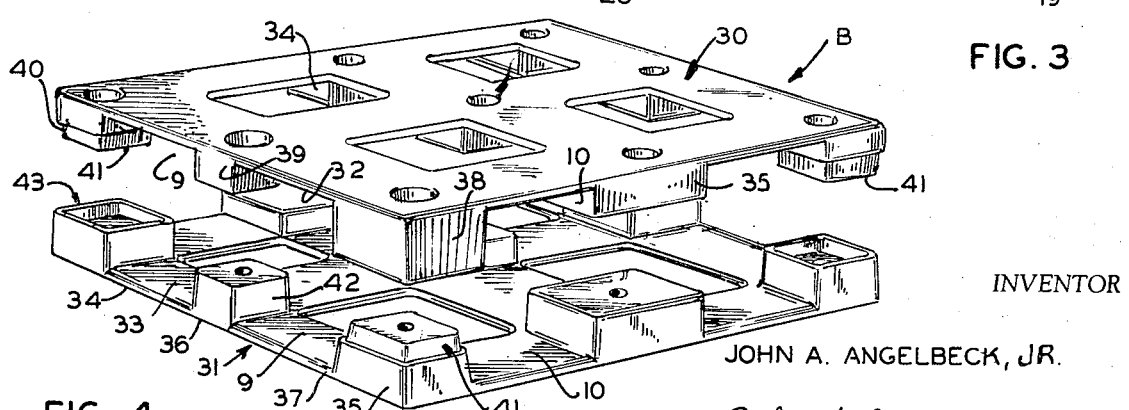
FIG. 4 is an exploded perspective view of a modified form of pallet constructed in accordance with and embodying the present invention.

It is also possible to provide a modified form of pallet B which is more fully illustrated in FIG. 4, and which is similar to the pallet A illustrated in FIGS. 1-3. The pallet B also includes upper and lower pallet forming sections 30, 31 which are secured together in marginal registration by means of metal fasteners of the type used in the pallet A. Furthermore, each of the pallet forming sections 30, 31 is individually formed as an integral unit with a pair of essentially opposed spaced sheets or skins in the manner as illustrated in FIG. 4. The upper pallet forming section 30 is similar to the upper pallet forming section 1 with the exception that the pallet forming section 30 has a bottom wall 32 which differs from the bottom wall 5 of the upper pallet forming section 1. In like manner, the lower pallet forming section 31 is similar to the lower pallet forming section 2 with the exception that the lower pallet forming section 31 has a top wall 33 which differs from the top wall 6 of the lower pallet forming section 2.

The upper pallet forming section 30 is provided with a relatively flat top wall 34 which merges into a rectangularly shaped peripheral wall 35. The lower pallet forming section 31 is also provided with a relatively flat bottom wall 36 which merges into a rectangularly shaped peripheral wall 37. The peripheral wall 35 integrally merges into the bottom wall 32 and the peripheral wall 36 integrally merges into the top wall 33.

By further reference to FIG. 4, it can be seen that the pallet B is provided with a pair of longitudinally extending skid receiving slots 9 and a pair of laterally extending skid receiving slots 10 which divide the bottom wall 32 and the top wall 33 into a series of steps. However, the steps in each of these sections have planar surfaces which are not located at the same distance from the top wall 34 and the bottom wall 36 of the respective pallet forming sections 30, 31.

Thus, starting at one corner of the upper pallet forming section 30, it can be seen that a longitudinally extending and a laterally extending portion of the peripheral wall 35 have a step 38 which is located so that the downwardly presented face thereof is spaced from the upper surface of the top wall 34 by approximately ⅔ of the overall vertical dimension of the pallet B. The step 38 on both the longitudinally and laterally extending portions of the peripheral wall 35 integrally merge into second steps 39 which have downwardly presented faces spaced from the upper surface of the top wall 34 by approximately ½ of the overall vertical dimension of the pallet B. Finally, the steps 39 on each of the longitudinally and laterally extending portions of the peripheral wall 35 integrally merge into steps 40 which have downwardly presented faces spaced from the upper surface of the top wall 34 by approximately ⅓ of the overall dimension of the pallet B.

It can be seen that the corner step 40 on the lateral wall merges into a similar corner step on the longitudinal portion of the peripheral wall 35, adjacent thereto and that the corner step 40 on the longitudinal portion of the peripheral wall 35 merges into a similar corner step on the adjacent longitudinal portion of the wall 35. Thus, it can be seen that the bottom wall 32 is comprised of a network of steps having planar surfaces which are parallel to and located at varying distances from the top wall 34.

The top wall 33 of the lower pallet forming section 31 has a structure similar to that of the downwardly presented surface of the bottom wall 32. Thus, starting at one corner of the lower pallet forming section 31, it can be seen that a longitudinally extending and a laterally extending portion of the peripheral wall 37 have a step 41 which is opposed to a corner step 38 and is located so that the upwardly presented face thereof is spaced from the lower surface of the bottom wall 36 by a distance which is approximately ⅓ of the overall vertical dimension of the pallet B. The step 41 integrally merges into center steps 42 which have upwardly presented faces spaced from the lower surface of the bottom wall 36 by approximately ½ of the overall vertical dimension of the pallet B. Finally, the steps 42 integrally merge into steps 43 which have upwardly presented faces spaced from the lower surface of the bottom wall by approximately ⅔ of the overall vertical dimension of the pallet B. It can thus be seen that the top wall 33 is comprised of a network of steps which are located at varying distances from the bottom wall 36.

It can also be observed, by reference to FIG. 4, that a step 38 which has a thickness of approximately ⅔ of the overall vertical dimension of the pallet B is opposed to and engages a step 41 which has a thickness of approximately ⅓ of the overall vertical dimension of the pallet B. A step 39 which has a thickness of approximately ½ of the overall vertical dimension of the pallet B is opposed to and engages a step 42 which also has a thickness of approximately ½ of the overall vertical dimension of the pallet A. Finally, a step 40, which has a thickness of approximately ⅓ of the overall vertical dimension of the pallet B is opposed to and engages a step 43 which has a thickness of approximately ⅔ of the overall vertical dimension of the pallet B. Thus, it can be seen that the steps of the two walls 32, 33 are mated with each other and form an interlocking structure when the upper and lower pallet forming sections 30, 31 are facewise disposed upon each other. The steps 40, 41 are each provided with extended rectangularly shaped peripheral flanges 44 which engage the steps 38, 43 respectively and thereby provide an interlocking structure when the two sections 30, 31 are in juxtaposition.

The pallet B is otherwise formed with the same recesses and bolt receiving apertures as the pallet A and the two pallet forming sections 30, 31 are secured in the same manner. Furthermore, it should be observed that the two pallet forming sections 30, 31 are essentially mirror images of each other and therefore can be formed in the same mold. Again, the upper pallet forming section 30 is only rotated 180° in a horizontal plane and inverted so that it can be placed in a mating position with the lower pallet forming section 31. The pallet B also exhibits the same versitility and finds the same utility as the pallet A.

It should be understood that changes and modifications in the form, construction, arrangement and combination of parts presently described and pointed out may be made and substituted for those herein shown without departing from the nature and principle of my invention.

What is claimed is:

1. A load carrying pallet comprising a first pallet forming section and a second pallet forming section, each of said pallet forming sections being formed substantially of a plastic material as substantially integral structures, said first pallet forming section having a first wall with a surface adapted to receive load bearing structures thereon and a second wall spaced from and having a portion thereof substantially parallel to said first wall, a first peripheral wall extending around and connecting said first and second walls, said second pallet forming section having a third wall adapted to engage a floor or other supporting member and a fourth wall spaced from said third wall and having a portion thereof substantially parallel to said third wall, a second peripheral wall extending around and connecting said third and fourth walls, said second and fourth walls having opposed step-wise mating surfaces and said first and second peripheral walls having step-wise mating surfaces, and a plurality of independent mechanical-type fasteners connecting said first and second pallet forming sections together to thereby form a rigid structure.

2. The load carrying pallet of claim 1 further characterized in that the fasteners extend through portions of said first, second, third and fourth walls.

3. The load carrying pallet of claim 1 further characterized in that web-like elements extend between said first and second walls to integrally join said first and second walls, and that web-like elements extend between said third and fourth walls to integrally join said third and fourth walls.

4. The load carrying pallet of claim 1 further characterized in that web-like elements extend between said first and second walls to integrally join said first and second walls, and that web-like elements extend between said third and fourth walls to integrally join said third and fourth walls, and further that apertures extend between said first and second walls and between said third and fourth walls in the region of each of said web-like elements in such manner that each web-like element forms such aperture.

5. The load carrying pallet of claim 1 further characterized in that said first and third walls are provided with recessed portions in the area of the apertures and web-like elements and where said apertures receive said mechanical-type fasteners.

6. The load carrying pallet of claim 1 further characterized in that said first and second pallet forming sections are provided with a plurality of enlarged aligned apertures, and that the mechanical-type fasteners are metal fasteners which have portions extending through said aligned apertures.

7. The load carrying pallet of claim 1 further characterized in that a plurality of enlarged slots extend through opposed portions of said first and second peripheral walls, a plurality of enlarged apertures extend through opposed portions of said first, second, third and fourth walls, and that the enlarged apertures extending through said first, second, third and fourth walls communicate with certain ones of the slots extending through portions of said first and second peripheral walls.

8. The load carrying pallet of claim 6 further characterized in that said metal fasteners are bolt and nut type fasteners.

9. A load carrying pallet comprising a first pallet forming section and a second pallet forming section, each of said pallet forming sections being formed substantially of a plastic material as substantially integral structures, said first pallet forming section having a first wall with a surface adapted to receive load bearing structures thereon and a second wall spaced from and having a portion thereof substantially parallel to said first wall, a first peripheral wall extending around and connecting said first and second walls, said second pallet forming section having a third wall adapted to engage a floor or other supporting member and a fourth wall spaced from said third wall and having a portion thereof substantially parallel to said third wall, a second peripheral wall extending around and connecting said third and fourth walls, said second and fourth walls having opposed step-wise mating surfaces including a plurality of spaced steps, each of last-named steps having planar surfaces which are substantially parallel to said first and third walls and which planar surfaces are equidistantly spaced from said first and third walls, and a plurality of mechanical-type metal fasteners extending through portions of each of said first and second sections to connect said first and second pallet forming sections together to thereby form a rigid structure.

10. A load carrying pallet comprising a first pallet forming section and a second pallet forming section, each of said pallet forming sections being formed substantially of a plastic material as substantially integral structures, said first pallet forming section having a first wall with a surface adapted to receive load bearing structures thereon and a second wall spaced from and having a portion thereof substantially parallel to said first wall, a first peripheral wall extending around and connecting said first and second walls, said second pallet forming section having a third wall adapted to engage a floor or other supporting member and a fourth wall spaced from said third wall and having a portion thereof substantially parallel to said third wall, a second peripheral wall extending around and connecting said third and fourth walls, said second and fourth walls having opposed step-wise mating surfaces including a plurality of spaced steps, each of last-named steps having planar surfaces which are substantially parallel to said first and third walls, the planar surfaces of the steps on said first section being formed in such manner that some of the planar surfaces are closer to said first wall than others of said planar surfaces on said first section, the planar surfaces of the steps on said second section being formed in such manner that some of such planar surfaces are closer to said third wall than others of said planar surfaces on said second section, and a plurality of mechanical-type metal fasteners extending through portions of each of said first and second sections to connect said first and second pallet forming sections together to thereby form a rigid structure.

* * * * *

UNITED STATES PATENT OFFICE
CERTIFICATE OF CORRECTION

Patent No. 3,667,403                    Dated June 6, 1972

Inventor(s) Angelbeck, John A., Jr.

It is certified that error appears in the above-identified patent and that said Letters Patent are hereby corrected as shown below:

Column 1, line 55, after "counterparts" insert a comma ---(,)---;

Column 2, line 2, delete "which" and insert therefor ---where---;

Column 2, line 23, delete "and";

Column 3, line 45, delete "rotation" and insert therefor ---rotational---;

Column 3, line 47, delete "pallets," and insert therefor ---pallet---;

Column 5, line 22, delete "webb" and insert therefor ---web---;

Column 7, line 10, delete "step" and insert therefor ---steps---;

Column 9, line 10, (Claim 9) after "each of" insert ---said---;

Column 10, line 10, (Claim 10) after "each of" insert ---said---.

Signed and sealed this 2nd day of January 1973.

(SEAL)
Attest:

EDWARD M. FLETCHER, JR.　　　　　　　ROBERT GOTTSCHALK
Attesting Officer　　　　　　　　　　Commissioner of Patents